United States Patent
Lavedrine

(10) Patent No.: US 6,633,374 B1
(45) Date of Patent: Oct. 14, 2003

(54) DOSIMETER FOR ASSESSING DEGREE OF ILLUMINATION

(75) Inventor: Bertrand Lavedrine, Paris (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 09/807,404

(22) PCT Filed: Oct. 5, 1999

(86) PCT No.: PCT/FR99/02379

§ 371 (c)(1),
(2), (4) Date: Apr. 13, 2001

(87) PCT Pub. No.: WO00/22389

PCT Pub. Date: Apr. 20, 2000

(30) Foreign Application Priority Data

Oct. 13, 1998 (FR) .............................. 98 12825

(51) Int. Cl.[7] .............. G01J 1/46; G01J 1/42; G01N 21/00
(52) U.S. Cl. ............... 356/215; 356/218; 250/474.1
(58) Field of Search ................. 356/213, 215, 356/218, 221; 250/474.1

(56) References Cited

U.S. PATENT DOCUMENTS

| 3,907,732 | A | * | 9/1975 | Maryama et al. ............ 252/408 |
| 4,308,459 | A | * | 12/1981 | Williams ..................... 250/474 |
| 4,991,074 | A | * | 2/1991 | Kobayashi et al. .......... 362/457 |
| 5,075,557 | A | | 12/1991 | Harasawa et al. ....... 250/474.1 |
| 5,206,118 | A | * | 4/1993 | Sidney et al. ................ 430/343 |

FOREIGN PATENT DOCUMENTS

BE 902327 8/1995

* cited by examiner

*Primary Examiner*—David N. Spector
(74) *Attorney, Agent, or Firm*—Young & Thompson

(57) ABSTRACT

A dosimeter for evaluating the degree of illumination by a change in coloration includes a substrate on which is positioned a light-sensitive coloring substance, where the coloring substance is formed of a mixture of several organic dyes dispersed in a polymer matrix and coated onto paper.

12 Claims, No Drawings

DOSIMETER FOR ASSESSING DEGREE OF ILLUMINATION

CROSS-REFERENCE TO RELATED APPLICATIONS

The present invention relates to dosimeters for evaluating the degree of illumination of objects, such as woks of art, during their display, in particular in museums and temporary exhibitions.

BACKGROUND OF THE INVENTION

Some cultural heritage objects are very fragile and their exposure to light has to be restricted to a few tens of thousands of lux.hour, in conformity with very strict recommendations.

FIELD OF THE INVENTION

Monitoring measurements can be taken using photoelectric cells but this selective evaluation quickly reaches its limits during a loan or when the items are subjected to natural lighting. Thus, it often proves difficult to recognize the light dose received by the items and to know whether the prescribed limit has been exceeded.

Several attempts have been made to develop a dosimeter by impregnating a paper substrate, a polymer or a glass substrate with an organic dye. Indicators of exposure (illuminance×time), such as Rhodamine B, provided in the form of strips of filter paper impregnated with a solution of Rhodamine B, and Litharge, as a paste applied to a paper cut into a strip and dried in darkness, are known in particular. Toshiko Kenjo, "Certain deterioration factors for works of art and simple devices to monitor them", The International Journal of Museum Management and Curatorship (1986), 5, 295–300. These suggestions have not, to the knowledge of the Applicant, resulted in the production of a tool used or usable in museums and collections.

Currently, the only solution widely employed in institutions consists in using scales of eight samples of wool dyed with blue dyes of increasing stability toward light. These scales were developed for the textile industry in order to determine the index of stability toward light of textile dyes.

These scales are exposed close to the items and the damage experienced by the blue scale is estimated visually or using a calorimeter. This method has limits, these scales are not very sensitive and it is difficult to quantitatively evaluate the extent of the irradiation. If precise measurements are desired, it is necessary to be equipped with an expensive measuring device, such as a calorimeter or a densitometer, in order to evaluate the degree of decomposition of the dyes, or else a cell which is permanently positioned close to the item and which measures the cumulative rumination. This device is expensive and bulky.

BRIEF SUMMARY OF THE INVENTION

The invention is aimed at overcoming the disadvantages of the prior devices by creating a dosimeter which combines simplicity of design with a sensitivity suited to the exposure acceptable for fragile objects and with good reproducibility of the results.

A subject matter of the invention is thus a dosimeter for evaluating the degree of illumination by a change in coloration comprising a substrate on which is positioned a coloring substance which is sensitive to visible light, characterized in that the coloring substance is formed of a mixture of several organic dyes, which absorb in different spectral regions, dispersed in a polymer matrix and coated onto paper.

DETAILED DESCRIPTION OF THE INVENTION

According to other characteristics of the invention:

the dyes are selected from the following dyes of the Color Index: CI: 42025, 42040, 42051, 42555, 42595, 42780, 44045, 45160, 45165, 45170, 45350, 45380, 4540 0, 45430, 5440, 46025, 49005, 49010, 52015 and 52040;

the polymer matrix comprises a binder based on vinyl acetate homopolymers which are sold as an aqueous emulsion by Raoul Labord, Z1, Chemin des Arpents, Saint-Germain-lès-Arpajon;

BP.25-91291 arpajon cedex, under the trade name Savatex N 385;

the emulsion employed comprises, inter alia, triacetin and, as plasticizer, phthalates;

the mixture used can comprise a sensitizer, such as linoleic acid or oleic acid, with a concentration of 0.1 to a few percent;

the range of concentrations of the dyes is between 0.01% and 0.05%, according to the dyes and the required sensitivity.

A number of examples of mixtures of dyes used for the preparation of dosimeters according to the invention will now be described.

Mention may be made of the following examples of mixtures of dyes:

EXAMPLE 1

CI No. 45400+52040

EXAMPLE 2

CI No. 45400+52040+45350

EXAMPLE 3

CI No. 45430+42555+52040

EXAMPLE 4

CI No. 44045+45440+45350

The Color Index is a table of dyes published by the Society of Dyers and Colorists, Bradford, West Yorkshire and The American Association of Textile Chemists and Colorists, Research Triangle Park, 1971, mentioned in the work The Sigma—Aldrich Handbook of Stains, Dyes and Indicators by Floyd J. Green, Aldrich Chemical Company Inc., Milwaukee, Wis., 1990.

The range of concentration is between 0.01% and 0.05%, according to the dyes and the required sensitivity.

The sensitivity obtained makes it possible to provide for the measurement of rumination between 5 000 and at least 500 000 lux·hour.

Examples of the preparation of dosimeters according to the invention will now be described.

EXAMPLE 5

The constituents participating in the composition of the dosimeter are as follows:

| | |
|---|---|
| 0.5% solution of CI 52040 in distilled water | 0.5 ml |
| 0.5% solution of CI 45400 in distilled water | 0.8 ml |
| oleic acid | 0 to 3 drops |
| Savatex N385 | 20 ml |
| 0.5% solution of CI 45350 in distilled water | 0 to 0.5 ml |

These constituents are mixed until a homogeneous mixture is obtained.

The mixture obtained is poured onto a rotating disk of bristol board with a diameter of 20 cm (spin coating).

They are subsequently left to dry in the air and in darkness.

EXAMPLE 6

The constituents participating in the composition of the dosimeter are as follows:

| | |
|---|---|
| 0.5% solution of CI 52040 in distilled water | 0.5 ml |
| 0.5% solution of CI 45440 in distilled water | 0.5 ml |
| oleic acid | 2 drops |
| Savatex N385 | 20 ml |

These constituents are treated in the same way as those in Example 5.

The proportions of the constituents participating in the composition of the dosimeter of the invention are generally within the following limits:

0.5% solution of CI 52040 or CI 42555 or CI 42780 or CI 52015 or CI 44045 in distilled water (blue) . . . 0.1 ml to 1 ml 0.5% solution of CI 45440 or CI 45400 or CI 45430 in distilled water (red) . . . 0.1 ml to 1 ml 0.5% solution of CI 45350 or CI 49010 or CI 46025 in distilled water (yellow) . . . 0.1 ml to 1 ml oleic or linoleic acid . . . 0 to 3 drops Savatex N385 . . . 20 ml The invention exhibits the following advantages in comparison with the existing techniques:

low production costs;

small size and thus the possibility of positioning a dosimeter close to each item;

easy handling;

visual evaluation of the irradiation received by change in colors;

increased sensitivity in comparison with existing systems;

complete bleaching above a certain level of irradiation.

What is claimed is:

1. A dosimeter for evaluating the degree of illumination by a change in coloration comprising a substrate on which is positioned a light-sensitive coloring substance, said light-sensitive coloring substance being formed of a mixture of a plurality of organic dyes dispersed in a polymer matrix and coated onto paper, wherein said dyes are selected from the group consisting of the following numbers in the Color Index: CI 42025, 42040, 41051, 42555, 42595, 42780, 44045, 45160, 45165, 45170, 45350, 45380, 45400, 45430, 45440, 46025, 49005, 49010, 52015 and 52040.

2. The dosimeter as claimed in claim 1, wherein the polymer matrix comprises a binder based on vinyl acetate homopolymers as an aqueous emulsion.

3. The dosimeter as claimed in claim 2, wherein the emulsion employed comprises, inter alia, triacetin and, as plasticizer, phthalates.

4. The dosimeter as claimed in claim 1, wherein the mixture used comprises a sensitizer, with a concentration of 0.1 to a few percent.

5. The dosimeter as claimed in claim 1, wherein the range of concentration of the dyes is from 0.01 to 0.05%, according to the dyes used and the required sensitivity.

6. The dosimeter as claimed in claim 1, wherein the proportions of the constituents participating in the composition of the dosimeter are within the following limits:

0.5% solution of CI 52040 or CI 42780 or CI 52015 or CI 44045 in distilled water . . . 0.1 ml to 1 ml 0.5% solution of CI 45440 or CI 45400 or CI 45430 in distilled water . . . 0.1 ml to 1 ml 0.5% solution of CI 45350 or CI 46025 or CI 49010 in distilled water . . . 0.1 ml to 1 ml oleic or linoleic acid . . . 0 to 3 drops binder based on vinyl acetate homopolymers . . . 20 ml.

7. The dosimeter as claimed in claim 6, wherein that the constituents participating in the composition of the dosimeter are as follows:

0.5% solution of CI 52040 in distilled water . . . 0.5 ml 0.5% solution of CI 45400 in distilled water . . . 0.8 ml oleic acid . . . 0 to 3 drops binder based on vinyl acetate homopolymers . . . 20 ml 0.5% solution of CI 45350 in distilled water . . . 0 to 0.5 ml.

8. The dosimeter as claimed in claim 1, wherein the constituents participating in the composition of the dosimeter are as follows:

0.5% solution of CI 52040 in distilled water . . . 0.5 ml 0.5% solution of CI 45440 in distilled water . . . 0.5 ml oleic acid . . . 2 drops binder based on vinyl acetate homopolymers . . . 20 ml.

9. The dosimeter as claimed in claim 4, wherein said sensitizer is selected from the group consisting of linoleic acid and the oleic acid.

10. A dosimeter for evaluating the degree of illumination by a change in coloration comprising:

a substrate on which is positioned a light-sensitive coloring substance, the coloring substance being formed of a plurality of several organic dyes dispersed in a polymer matrix and coated onto paper, wherein the proportions of the constituents participating in the composition of the dosimeter are within the following limits:

0.5% solution of CI 52040 or CI 42780 or CI 52015 or CI 44045 in distilled water . . . 0.1 ml to 1 ml 0.5% solution of CI 45440 or CI 45400 or CI 45430 in distilled water . . . 0.1 ml to 1 ml 0.5% solution of CI 45350 or CI 46025 or CI 49010 in distilled water . . . 0.1 ml to 1 ml oleic or linoleic acid . . . 0 to 3 drops binder based on vinyl acetate homopolymers . . . 20 ml.

11. The dosimeter as claimed in claim 10, wherein that the constituents participating in the composition of the dosimeter are as follows:

0.5% solution of CI 52040 in distilled water . . . 0.5 ml 0.5% solution of CI 45400 in distilled water . . . 0.8 ml oleic acid . . . 0 to 3 drops binder based on vinyl acetate homopolymers . . . 20 ml
0.5% solution of CI 45350 in distilled water . . . 0 to 0.5 ml.

12. A dosimeter for evaluating the degree of illumination by a change in coloration comprising:
   a substrate on which is positioned a light-sensitive coloring substance, the coloring substance being formed of a plurality of several organic dyes dispersed in a polymer matrix and coated onto paper,
   wherein the constituents participating in the composition of the dosimeter are as follows:
   0.5% solution of CI 52040 in distilled water . . . 0.5 ml
   0.5% solution of CI 45440 in distilled water . . . 5 ml
   oleic acid . . . 2 drops
   binder based on vinyl acetate homopolymers . . . 20 ml.

* * * * *